United States Patent
Morein (10) Patent No.: US 9,671,027 B2
(45) Date of Patent: Jun. 6, 2017

(54) AXIALLY PRELOADED SEALING ELEMENT

(71) Applicant: Schaeffler Technologies AG & Co. KG, Herzogenaurach (DE)

(72) Inventor: Alexander Joseph Morein, Royal Oak, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/700,561

(22) Filed: Apr. 30, 2015

(65) Prior Publication Data

US 2016/0319943 A1    Nov. 3, 2016

(51) Int. Cl.
| | |
|---|---|
| *F16K 5/08* | (2006.01) |
| *F16K 5/18* | (2006.01) |
| *F16K 5/06* | (2006.01) |

(52) U.S. Cl.
CPC ............. *F16K 5/18* (2013.01); *F16K 5/0668* (2013.01); *F16K 5/08* (2013.01)

(58) Field of Classification Search
CPC ... F16K 5/18; F16K 25/00; F16K 5/20; F16K 5/04; F16K 5/06; F16K 5/08; F16K 5/0668
USPC ........ 251/192, 314–317, 315.01, 315.1, 309, 251/304
See application file for complete search history.

(56) References Cited

U.S. PATENT DOCUMENTS

| | | | | | |
|---|---|---|---|---|---|
| 2,700,528 | A | * | 1/1955 | Blackman | F16K 5/0264 251/166 |
| 2,711,302 | A | * | 6/1955 | McWhorter | F16K 5/0264 137/556.3 |
| 3,030,068 | A | * | 4/1962 | Priese | F16K 5/0668 251/172 |
| 3,067,977 | A | * | 12/1962 | Anderson | F16K 5/0678 137/315.2 |
| 3,131,906 | A | * | 5/1964 | King | F16K 5/0673 251/315.05 |
| 3,186,680 | A | * | 6/1965 | Pool | F16K 3/0227 251/175 |
| 3,334,862 | A | * | 8/1967 | Hookway, Jr. | F16K 5/208 251/288 |
| 3,357,679 | A | * | 12/1967 | Gulick | F16K 5/0673 251/172 |
| 3,380,706 | A | * | 4/1968 | Domer | F16K 5/0631 251/148 |

(Continued)

FOREIGN PATENT DOCUMENTS

DE    102009014047 A1    3/2009

*Primary Examiner* — John Bastianelli
(74) *Attorney, Agent, or Firm* — Volpe and Koenig, P.C.

(57) ABSTRACT

A valve arrangement including a sealing element is provided. The valve arrangement includes a housing having a port. A rotary valve body includes an opening, and the rotary valve body is arranged within the housing. The port of the housing and the opening of the rotary valve body are alignable with each other via rotation of the rotary valve body in the housing. A sealing element is arranged within the port. The sealing element includes a seal body having a first axial end engaged against the rotary valve body and a second axial end including a resilient axially compressible portion that engages against a seat in the housing. The resilient axially compressible portion of the sealing element preloads the sealing element axially against the rotary valve body.

10 Claims, 9 Drawing Sheets

(56) References Cited

U.S. PATENT DOCUMENTS

| | | | | |
|---|---|---|---|---|
| 3,455,534 A | * | 7/1969 | Scaramucci | F16K 5/0673 251/175 |
| 3,584,641 A | * | 6/1971 | Milleville | F16K 5/0673 137/246.15 |
| 4,254,793 A | * | 3/1981 | Scaramucci | F16K 5/0673 137/246.22 |
| 4,552,335 A | * | 11/1985 | Alexander | F16K 5/0673 251/315.05 |

* cited by examiner

AXIALLY PRELOADED SEALING ELEMENT

FIELD OF INVENTION

The present invention relates a sealing element, and is more particularly related to an axially preloaded sealing element for contacting a rotary valve body.

BACKGROUND

Sealing elements are used in a variety of applications, including thermal management modules with coolant control valves. Typically, the sealing element in a coolant control valve is arranged between a port formed in a housing and a rotary valve body within the housing. The rotary valve body is connected a rotating shaft that rotates the rotary valve body to control the amount of fluid that can pass into or out of the housing via the rotary valve body. In known valve arrangements, a spring is provided between the housing and the sealing element that contacts the rotary valve body to preload the sealing element axially against the rotary valve body. These known sealing assemblies require multiple components to ensure that the sealing element maintains sealing contact with the rotary valve body to prevent leakage and ensure reliable operation.

It would be desirable to provide a simplified sealing element that reduces assembly time and the number of components while providing a reliable axial preload against the rotary valve body.

SUMMARY

An improved sealing element including an integrally formed protrusion that provides an axial preload which can be used, for example, to press the sealing element against a rotary valve body is provided. In one embodiment, a valve arrangement including a housing with a port is provided. The rotary valve body includes an opening and is arranged within the housing. The port of the housing and the opening of the rotary valve body are alignable with each other via rotation of the rotary valve body in the housing. A sealing element is arranged within the port. The sealing element includes a seal body having a first axial end sealingly engaged against the rotary valve body and a second axial end including a resilient axially compressible portion that engages against a seat in the housing or a fitting arranged in the housing, preferably in or around the port. The resilient axially compressible portion of the sealing element preloads the sealing element axially against the rotary valve body and may also seal against the housing or fitting around or in the port.

In another embodiment, a valve arrangement including a housing having a port with a circumferential shoulder arranged therein is provided. A rotary valve body which includes an opening is arranged within the housing. The port of the housing and the opening of the rotary valve body are alignable with each other via rotation of the rotary valve body in the housing. A sealing element is arranged within the port. The sealing element includes a seal body having a first axial end sealingly engaged against the rotary valve body and a second axial end including a resilient axially compressible portion that engages a surface of the circumferential shoulder in the port. The resilient axially compressible portion of the sealing element preloads the sealing element axially against the rotary valve body and may also seal against a wall of the housing around or in the port.

Additional embodiments are described below and in the claims.

BRIEF DESCRIPTION OF THE DRAWINGS

The foregoing Summary and the following detailed description will be better understood when read in conjunction with the appended drawings, which illustrates a preferred embodiment of the invention. In the drawings.

DETAILED DESCRIPTION OF THE PREFERRED EMBODIMENTS

Certain terminology is used in the following description for convenience only and is not limiting. The words "front," "rear," "upper," and "lower" designate directions in the drawings to which reference is made. The words "inwardly" and "outwardly" refer to directions toward and away from the parts referenced in the drawings. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
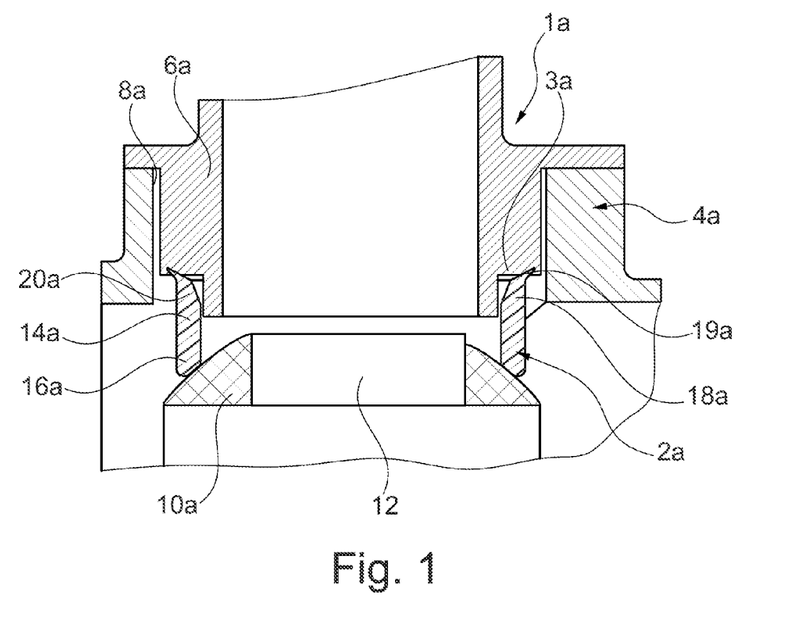
FIG. 1 shows a cross-sectional view of a portion of a valve arrangement including a sealing element according to a first embodiment of the invention.

As shown in FIGS. 1-5, valve arrangements 1a-1h each including an axially preloaded sealing element 2a-2h are provided. As shown in FIGS. 1-4, the valve arrangements 1a-1d, 1f-1h each include a housing 4a-4d, 4f-4h with a fitting 6a-6d, 6f-6h arranged within a port 8a-8d, 8f-8h of the housing 4a-4d, 4f-4h. The fitting 6a-6d, 6f-6h is optional, and not included in the embodiment of FIG. 5. As shown in FIGS. 1-8, the valve arrangements 1a-h each include a rotary valve body 10a-10h, respectively including an opening 12. FIG. 1 shows the opening 12 of the rotatory valve body 10a. The rotary valve bodies 10a-10h are arranged within the respective housing 4a-4h, and the port 8a-8h of the housing 4a-4h and the opening 12 of the rotary valve body 10a-10h are alignable with each other via rotation of the rotary valve body 10a-10h in the respective housing 4a-4h. Fluid, e.g. coolant, is provided from the port 8a-8h to or from the housing 4a-4h via the opening 12 of the rotary valve body 10a-10h based on the rotational position of the rotary valve body 10a-10h. FIG. 1 shows the open position of the rotary valve body 10a. FIGS. 2-5 show the rotary valve body 10b-10h in a closed position. The rotary valve body 10a-10h is rotated via a shaft, which is not illustrated in the Figures.

Figure 2:
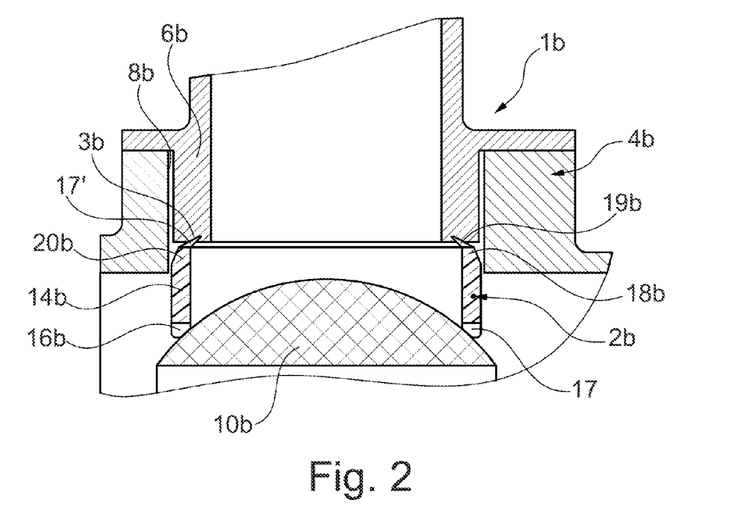
FIG. 2 shows a cross-sectional view of a portion of a valve arrangement including a sealing element according to a second embodiment of the invention.

As shown in FIGS. 1-8, the sealing elements 2a-2h are arranged within the port 8a-8h of the respective housing 4a-4h. The sealing elements 2a-2h are preferably formed from an elastomeric material. Preferably, the sealing elements 2a-2h are formed from a crystalline or semi-crystalline resin, but other materials could be used. In one embodiment, the sealing elements 2a-2h are formed from a polymeric material. One of ordinary skill in the art will recognize that the material of the sealing elements 2a-2h can vary, depending on the particular application of the valve arrangement. The sealing elements 2a-2h include a seal body 14a-14h having a first axial end 16a-16h engaged against the rotary valve body 10a-10h and a second axial end 18a-18h including a resilient axially compressible portion 19a-19h. The resilient axially compressible portions 19a-19d, 19f-19h engage against a respective seat 3a-3d, 3f-3h in the housings 4a-4d, 4f-4h. The resilient axially compressible portion 19a-19h preferably includes an at least partially radially extending protrusion 20a-20h. As shown in FIGS. 1-8, the at least partially radially extending protrusion 20a-20h is integrally formed with the respective sealing element 2a-2h. The sealing elements 2a-2h are illustrated in a non-deflected position for clarity, and the sealing lip(s) would resiliently compress against the mating surface(s) shown upon installation. As shown in FIG. 1, in one embodiment the sealing element 2a includes a radially outwardly extending protrusion 20a. As shown in FIG. 2, in another embodiment the sealing element 2b includes a radially inwardly extending protrusion 20b.

In the embodiments shown in FIGS. 1-4 and 6-8, the at least partially radially extending protrusion 20a-20d, 20f-20h engage against the respective fitting 6a-6d, 6f-6h. Although the at least partially radially extending protrusion 20a-20d, 20f-20h are shown engaging an axial end surface of the fitting 6a-6d, 6f-6h, one of ordinary skill in the art will recognize that the at least partially radially extending protrusion 20a-20d, 20f-20h could also engage a radial surface of the fitting 6a-6d, 6f-6h. The at least partially radially extending protrusion 20a-20h of the respective sealing elements 2a-2h preload the sealing elements 2a-2h axially against the respective rotary valve bodies 10a-10h in a direction of an axis of the port 8a-8h. The axial preload provided by the at least partially radially extending protrusion 20a-20h of each sealing element 2a-2h reduces the need for an additional biasing component, such as a Belleville spring or wave spring, to provide the preload between the sealing element 2a-2h and the rotatory valve body 10a-10h.

One of ordinary skill in the art will recognize that the shape of seal body 14a-14h of the sealing element 2a-2h can be varied depending the space requirements for a particular application. As shown in FIG. 2, in one embodiment, a surface coating 17, 17' is applied to at least one end surface of the first axial end 16a-16h or the second axial end 18a-18h. In one embodiment, the surface coating 17, 17' material has a higher elasticity than the seal body 14a-14h of the sealing element 2a-2h. The increased elasticity of the surface coating 17, 17' provides an improved ability to seal the first axial end 16a-16h and/or the second axial end 18a-18h against a respective surface. In one embodiment, only the second axial end 18a-18h includes the surface coating 17'. In one embodiment, the surface coating 17, 17' is formed from rubber. In another embodiment, the surface coating material 17 is selected so as to reduce friction between the axial end 16a-16h and the rotary valve body 10a-10h.

Figure 3:
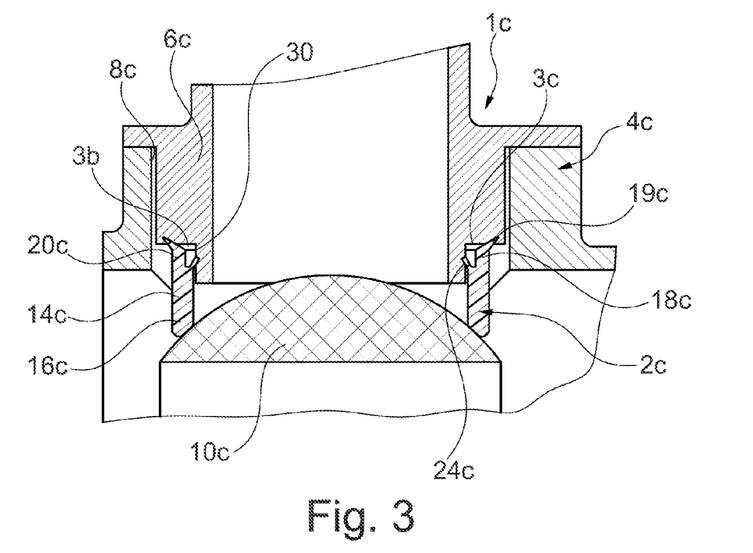
FIG. 3 shows a cross-sectional view of a portion of a valve arrangement including a sealing element according to a third embodiment of the invention.
Figure 3A:
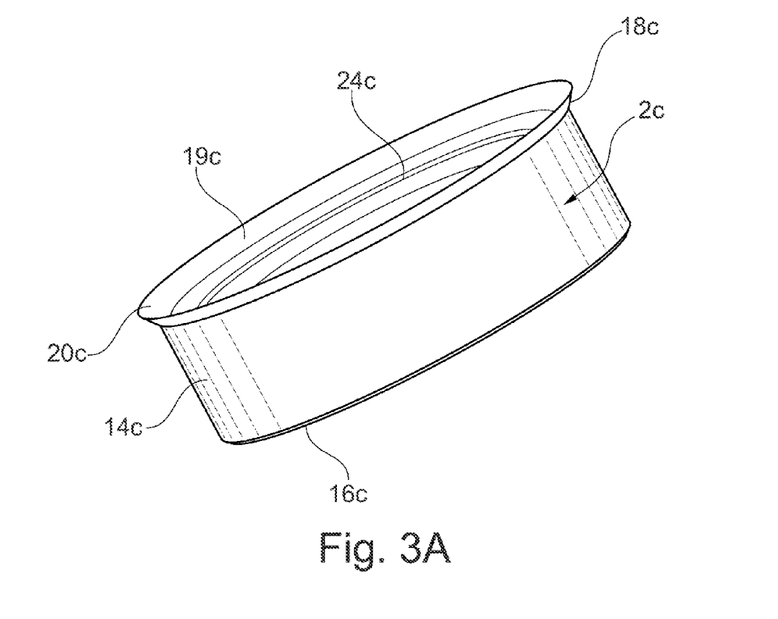
FIG. 3A shows a perspective view of the sealing element of FIG. 3.

As shown in FIGS. 3 and 3A, the third embodiment of the sealing element 2c includes a radially outwardly extending protrusion 20c and a lip 24c. In the third embodiment, the lip 24c is located radially inwardly from the radially outwardly extending protrusion 20c. The lip 24c engages against a radially outer surface 30 of a shoulder 36 of the fitting 6c. In this embodiment, engagement of the lip 24c against the shoulder 36 of the fitting 6c provides a secondary seal to the fitting in addition to the primary seal provided by the at least partially radially extending protrusion 20c of the sealing element 2c that is axially preloaded. One skilled in the art will recognize that the lip 24 can be arranged such that it engages with a different radially outward surface of the fitting 6c or some planar surface of fitting 6c parallel to the shoulder 36.

Figure 4:
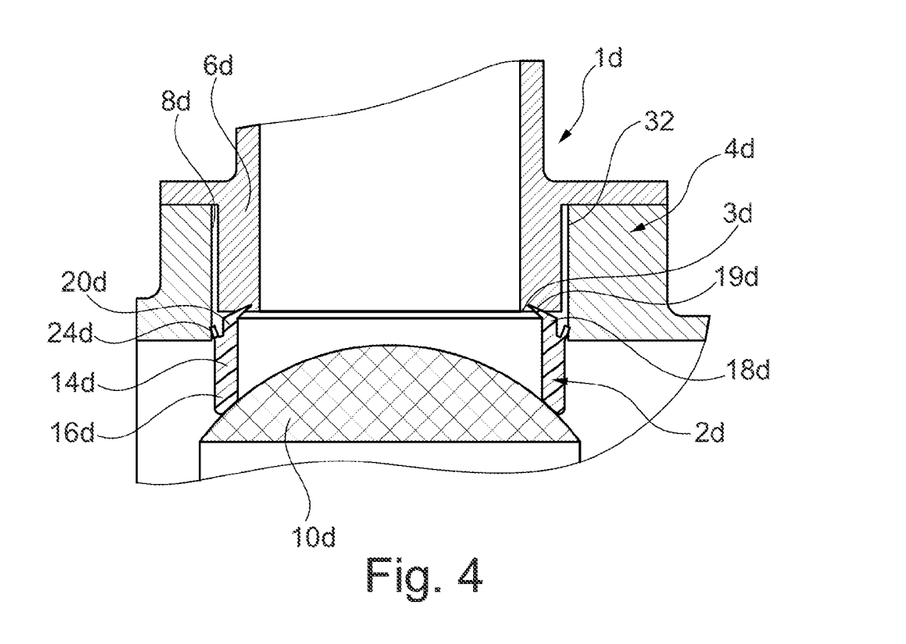
FIG. 4 shows a cross-sectional view of a portion of a valve arrangement including a sealing element according to a fourth embodiment of the invention.

As shown in FIG. 4, the fourth embodiment of the sealing element 2d includes a radially inwardly extending protrusion 20d and includes a lip 24d. In this embodiment, the lip 24d is located radially outwardly from the radially inwardly extending protrusion 20d. The lip 24d engages against a radially inner surface 32 of the port 8. The lip 24d provides a secondary seal in addition to the primary seal provided by the at least partially radially extending protrusion 20d of the sealing element 2d that is axially preloaded. One of skill in the art will recognize that the radially inner surface 32 could be relocated to a location on the fitting 6d, or that the lip 24d can engage with some planar surface of the housing 4d or fitting 6d that is perpendicular to the axis of the port 8d.

Figure 5:
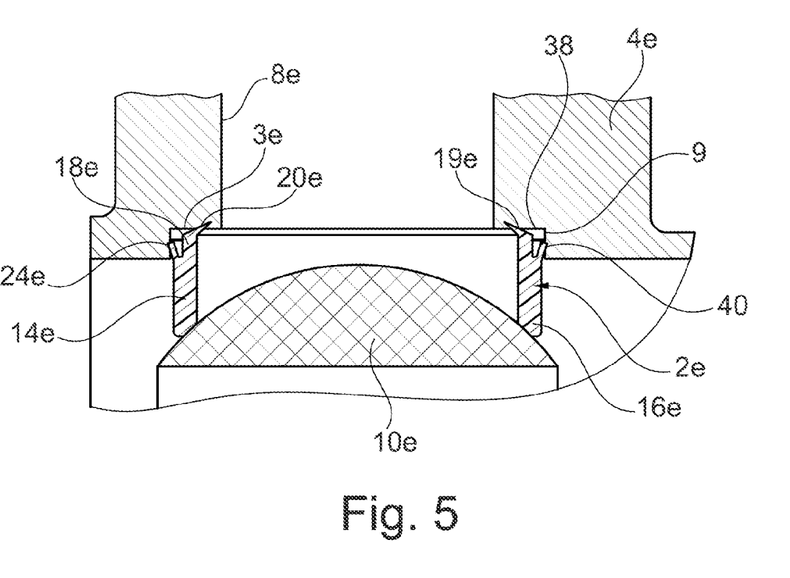
FIG. 5 shows a cross-sectional view of a portion of a valve arrangement including a sealing element according to a fifth embodiment of the invention.

In the fifth embodiment shown in FIG. 5, the housing 4e includes a port 8e with a circumferential shoulder 9 arranged therein. Unlike the embodiments shown in FIGS. 1-4 and 6-8, the fifth embodiment does not include a fitting. Here, an at least partially radially extending protrusion 20e on the second axial end 18e of the sealing element 2e engages against a surface of the shoulder 9 in the port 8e. In the fifth embodiment, the at least partially radially extending protrusion 20e extends radially inwardly and engages against an axial end surface 38 of the shoulder 9. The sealing element 2e includes a lip 24e that engages against a radially inner surface 40 of the shoulder 9. One of ordinary skill in the art will recognize that alternative arrangements of the fifth sealing element 2e could be used, such as a sealing element that does not include the lip 24e, a sealing element that includes a radially outwardly extending protrusion, or combinations thereof. Any variations of the sealing elements 2a-2d shown in FIGS. 1-4 and 6-8 could also be used in connection with the housing 4e configuration shown in FIG. 5.

Figure 6:
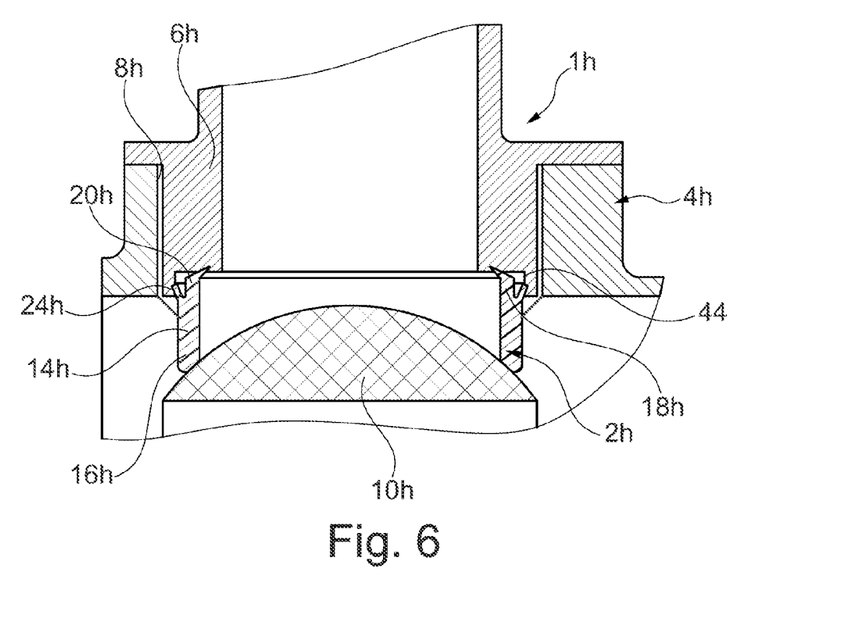
FIG. 6 shows a cross-sectional view of a portion of a valve arrangement including a sealing element according to a sixth embodiment of the invention.
Figure 7:
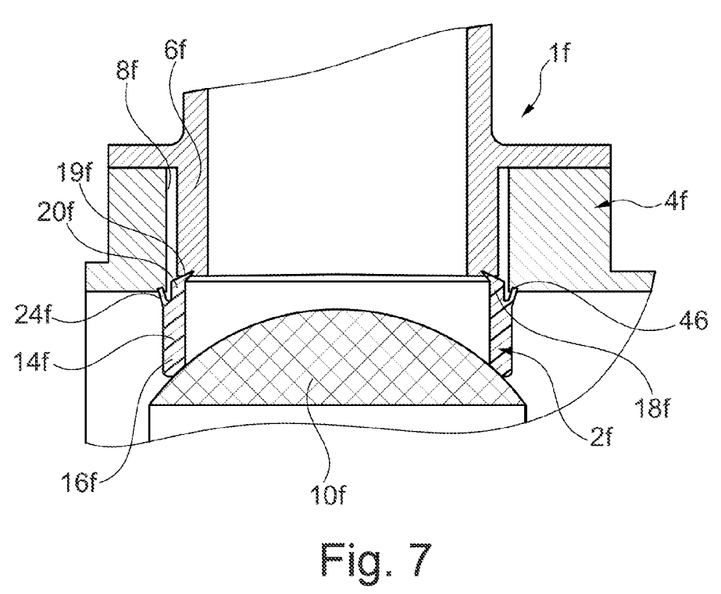
FIG. 7 shows a cross-sectional view of a portion of a valve arrangement including a sealing element according to a seventh embodiment of the invention.
Figure 8:
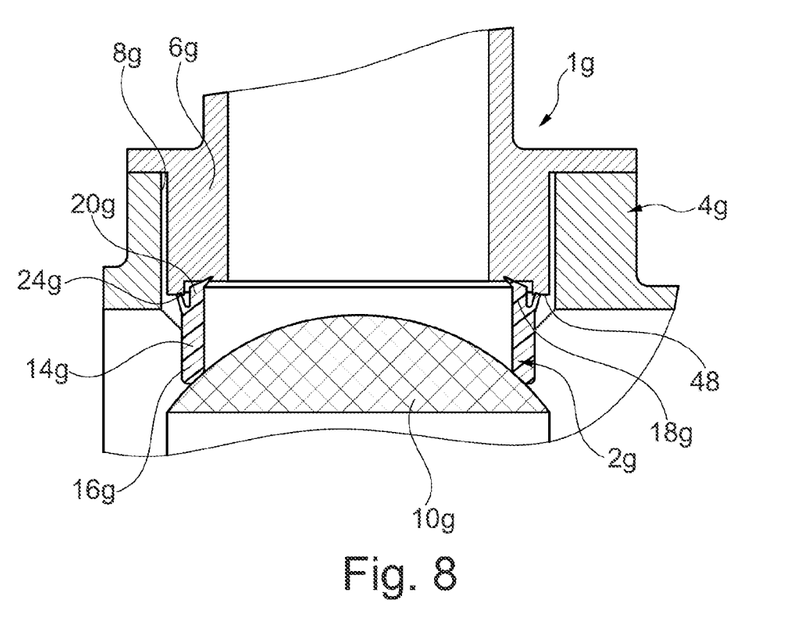
FIG. 8 shows a cross-sectional view of a portion of a valve arrangement including a sealing element according to an eighth embodiment of the invention.

As shown in FIG. 6, a sixth embodiment of the sealing element 2h is provided. In the embodiment of FIG. 6, the second axial end 18h of the sealing element 2h includes a sealing lip 24h, and the sealing lip 24h engages a radially inner surface 44 of the fitting 6h. As shown in FIG. 7, a seventh embodiment of the sealing element 2f is provided. In the embodiment of FIG. 7, the second axial end 18f of the sealing element 2f includes a sealing lip 24f, and the sealing lip 24f engages a planar surface 46 of the housing 4f that is perpendicular to the axis of the port 8f. As shown in FIG. 8, an eighth embodiment of the sealing element 2g is provided. In the embodiment of FIG. 8, the second axial end 18g of the sealing element 2g includes a sealing lip 24g, and the sealing lip 24g engages a planar surface 48 of the fitting 6g that is perpendicular to the axis of the port 8g.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A valve arrangement comprising:
a housing including a port;
a rotary valve body including an opening, the rotary valve body arranged within the housing, and the port of the housing and the opening of the rotary valve body are alignable with each other via rotation of the rotary valve body in the housing; and
a sealing element arranged within the port, the sealing element including a seal body having a first axial end engaged against the rotary valve body and a second axial end including a resilient axially compressible portion and a first sealing lip that engages against a seat in the housing and a second sealing lip that engages the seat in the housing, and the second sealing lip is arranged radially inwardly from the resilient axially compressible portion and engages a radially outer surface of the port, and the resilient axially compressible portion of the sealing element preloads the sealing element axially against the rotary valve body.

2. The valve arrangement of claim 1, wherein the seat is defined in or around the port.

3. The valve arrangement of claim 1, wherein the seat is defined by a fitting in the port.

4. The valve arrangement of claim 1, wherein the sealing element is formed from an elastomeric material.

5. The valve arrangement of claim 1, wherein the resilient axially compressible portion includes an at least partially radially extending protrusion.

6. The valve arrangement of claim 5, wherein the at least partially radially extending protrusion of the sealing element extends radially outwardly in the port.

7. The valve arrangement of claim 5, wherein the at least partially radially extending protrusion of the sealing element defines the first lip seal.

8. The valve arrangement of claim 1, wherein the second sealing lip engages against a radially outer surface of a shoulder of the port.

9. A valve arrangement comprising:
a housing including a port with a circumferential shoulder arranged therein;
a rotary valve body including an opening, the rotary valve body arranged within the housing, and the port of the housing and the opening of the rotary valve body are alignable with each other via rotation of the rotary valve body in the housing; and
a sealing element arranged within the port, the sealing element including a seal body having a first axial end engaged against the rotary valve body and a second axial end including a resilient axially compressible portion with a first sealing lip that engages a surface of the circumferential shoulder in the port and a second sealing lip arranged radially inwardly from the resilient axially compressible portion that engages a radially outer surface of the circumferential shoulder in the port, and the resilient axially compressible portion of the sealing element preloads the sealing element axially against the rotary valve body.

10. The valve arrangement of claim 9, wherein the resilient axially compressible portion engages against an axial end surface of the circumferential shoulder.

* * * * *